United States Patent [19]
Takahashi et al.

[11] 3,909,336
[45] Sept. 30, 1975

[54] APPARATUS FOR SUCCESSIVELY SUPPLYING ENDLESS TIRE BANDS TO A TIRE CARCASS PRODUCING EQUIPMENT

[75] Inventors: Shoji Takahashi; Toshinori Yabe, both of Kodaira, Japan

[73] Assignee: Bridgestone Tire Company Limited, Tokyo, Japan

[22] Filed: Apr. 19, 1973

[21] Appl. No.: 352,553

[52] U.S. Cl............... 156/405; 156/126; 156/394 R; 156/396; 156/420
[51] Int. Cl.² ................... B29H 17/02; B29H 17/10; B29H 17/37
[58] Field of Search............ 156/110, 123, 126–129, 156/133, 394, 396, 405, 406, 407, 414, 415, 417, 420

[56] References Cited
UNITED STATES PATENTS

| | | | |
|---|---|---|---|
| 1,887,187 | 11/1932 | Pfeiffer | 156/396 |
| 2,583,650 | 1/1952 | Hodgkins | 156/420 |
| 2,936,813 | 5/1960 | Hasse | 156/126 |
| 3,070,478 | 12/1962 | Riddle | 156/126 |
| 3,761,340 | 9/1973 | Klein | 156/126 |

FOREIGN PATENTS OR APPLICATIONS

| | | | |
|---|---|---|---|
| 600,469 | 6/1960 | Canada | 156/126 |
| 1,194,270 | 6/1970 | United Kingdom | 156/414 |

*Primary Examiner*—Clifton B. Cosby
*Assistant Examiner*—John E. Kittle
*Attorney, Agent, or Firm*—Oblon, Fisher, Spivak, McClelland & Maier

[57] ABSTRACT

The apparatus for successively supplying endless tire bands from a supply station onto a rotating forming drum of a tire carcass producing equipment comprises a holding column supported on a carriage which is reciprocally movably guided on a base of the apparatus. The holding column is provided with an expandable and contractable drum rotatably mounted thereon and a rotatable feeding bar mounted on the column adjacent to the drum. When the holding column is moved to a first position by the movement of the carriage, the expandable and contractable drum contacts with the forming drum of the tire carcass producing equipment in alignment therewith so as to be rotated thereby and, at the same time, is brought to its expanded position so that an endless tire band supported around the expanded drum and the feeding bar is allowed to be transferred onto the forming drum by the action of the feeding bar. When the holding column is moved to a second position by the movement of the carriage, the drum is moved to the supply station of the endless tire bands and is brought to its contracted position so that an endless tire band in the supply station is allowed to be supplied around the contracted drum and the feeding bar.

4 Claims, 6 Drawing Figures

Fig. 1

APPARATUS FOR SUCCESSIVELY SUPPLYING ENDLESS TIRE BANDS TO A TIRE CARCASS PRODUCING EQUIPMENT

BACKGROUND OF THE INVENTION

The present invention relates to an apparatus for successively supplying an endless tire band from a supply station of the endless tire bands onto a forming drum of a tire carcass producing equipment and more particularly, to a fully automatic apparatus for successively supplying such endless tire bands to the forming drum of the tire carcoss producing equipment.

Heretofore, endless tire bands have been manually or mechanically mounted successively around a forming drum of a tire carcass producing equipment in layers laid one around another in order to form a tire carcass by grasping one of the side edges of the endless tire band and expanding the same so as to be laid around the forming drum or around the endless tire band already laid around the forming drum by means of a feeding bar inserted between the endless tire band to be supplied and the drum or the already supplied endless tire band at a certain angle with respect to the longitudinal axis of the drum while the forming drum is rotated. Alternatively, the endless tire band is expanded radially by using a vacuum or a pneumatic device so that the expanded tire band is placed in position around the forming drum. Such prior art procedures are, however, very complicated in handling and require complicated construction of the device thereby making the efficiency low and the production cost very high.

The present invention aims at avoiding the above disadvantages of the prior art apparatus for supplying endless tire bands to the tire carcoss producing equipment.

SUMMARY OF THE INVENTION

An object of the present invention is to provide a novel and useful apparatus for successively supplying endless tire bands to a tire carcoss producing equipment in a fully automatic manner.

Another object is to provide a novel and useful apparatus of the type described above which is simple in construction and has very high efficiency in operation.

The above objects are achieved in accordance with the present invention by the provision of an apparatus for successively supplying endless tire bands which is characterized by a holding column mounted on a base of the apparatus and movable between a first position and a second position, an expandable drum rotatably mounted on the holding column and movable between an expanded position and a contracted position and a feeding bar rotatably mounted on the holding column adjacent to the periphery of the expandable drum for cooperation therewith so as to move an endless tire band supported around the drum and the bar out of the drum when the same is rotated while it is brought to the expanded position, driving means for moving the holding column reciprocally between the first position and the second position, the expandable drum being so positioned on the holding column that the same is contacted with the forming drum in alignment therewith so as to be rotated thereby when the holding column is brought to the first position while the expandable drum is brought to the supply station when the column is brought to the second position, actuating means for moving the expandable drum between the expanded position and the contracted position, and control means for operating the driving means and the actuating means in such timed relationship therebetween that the expandable drum is brought to the contracted position when the column is brought to the second position thereby permitting the drum and the feeding bar to receive therearound an endless tire band from the supply station while the expandable drum is brought to the expanded position when the column is brought to the first position so as to contact the expandable drum with the forming drum for rotation therewith thereby permitting the endless tire band supported around the drum and the feeding bar to be transferred therefrom onto the forming drum.

Advantageously, the holding column is secured to a rotatable cylinder which is in turn rotatably mounted on a carriage slidably mounted on guide bars secured to the base of the apparatus, and the carriage is reciprocally moved on the guide bars by means of hydraulic cylinder means interconnecting the carriage to the base so that the holding column is moved between the first position and the second position.

In accordance with a characteristic feature of the present invention, the holding column is secured to the rotatable cylinder at a position offset from the rotational axis thereof and is provided at its bottom with a guide roller at a position also offset from the rotational axis of the rotatable cylinder, and the guide roller slidably engages with a guide groove provided in the base. The guide groove is substantially parallel to the direction of the movement of the carriage on which the cylinder is rotatably mounted, but it has a curved portion adjacent to the end thereof corresponding to the second position of the column so that, when the carriage is moved so as to move the column to its first position, the expandable drum is moved axially thereof so as to abut against the forming drum of the tire carcass producing equipment in alignment therewith, while the carriage is moved so as to move the column to its second position, the cylinder and, hence, the column is rotated about the rotational axis of the cylinder by virtue of the engagement of the guide roller of the column with the curved portion of the guide groove in the base so as to position the expandable drum adjacent to the supply station. This construction enables the working space of the apparatus to be substantially reduced without causing any interference between the apparatus and the supply station.

In accordance with another feature of the present invention, the expandable drum is mounted on the free end of a shaft rotatably supported by the holding column and comprises a first series of segments and a second series of segments with segments in the first series alternating with the respective segments of the second series, and each of the segments of the first and second series is pivotally connected to the free end of the shaft by a pair of parallel links so as to form a parallelogram by the segment, the pair of links and the shaft so that the segment is moved toward and away from the shaft while the same is kept in parallel relation to the shaft. An operating means such as a hydraulic operating means is provided on the shaft which is reciprocally moved along the shaft when the operating means is energized. One of each pair of links of the first series of the segments is connected at its end connected to the segment with the operating means while one of each pair of links of the second series of the segments is pivotally connected at its intermediate point to the operating means so that, upon energization of the operating means in one direction, the segments of the first series and the segments of the second series are brought to the expanded position of the expandable drum while, upon energization of the operating means in the opposite direction, the segments of the second series are moved closer to the shaft than the segments of the first series by virtue of the position of the pivotal connection of the links of the second series of the segments so as to locate the segments of the second series inside of the segments of the first series to assume the contracted position of the expandable drum.

The apparatus of the present invention can successively supply endless tire bands automatically to the tire carcass producing equipment in an extremely efficient manner without fail thereby saving the time and cost for the manufacture of the tire carcus.

DETAILED DESCRIPTION OF THE PREFERRED EMBODIMENT

Figure 1:
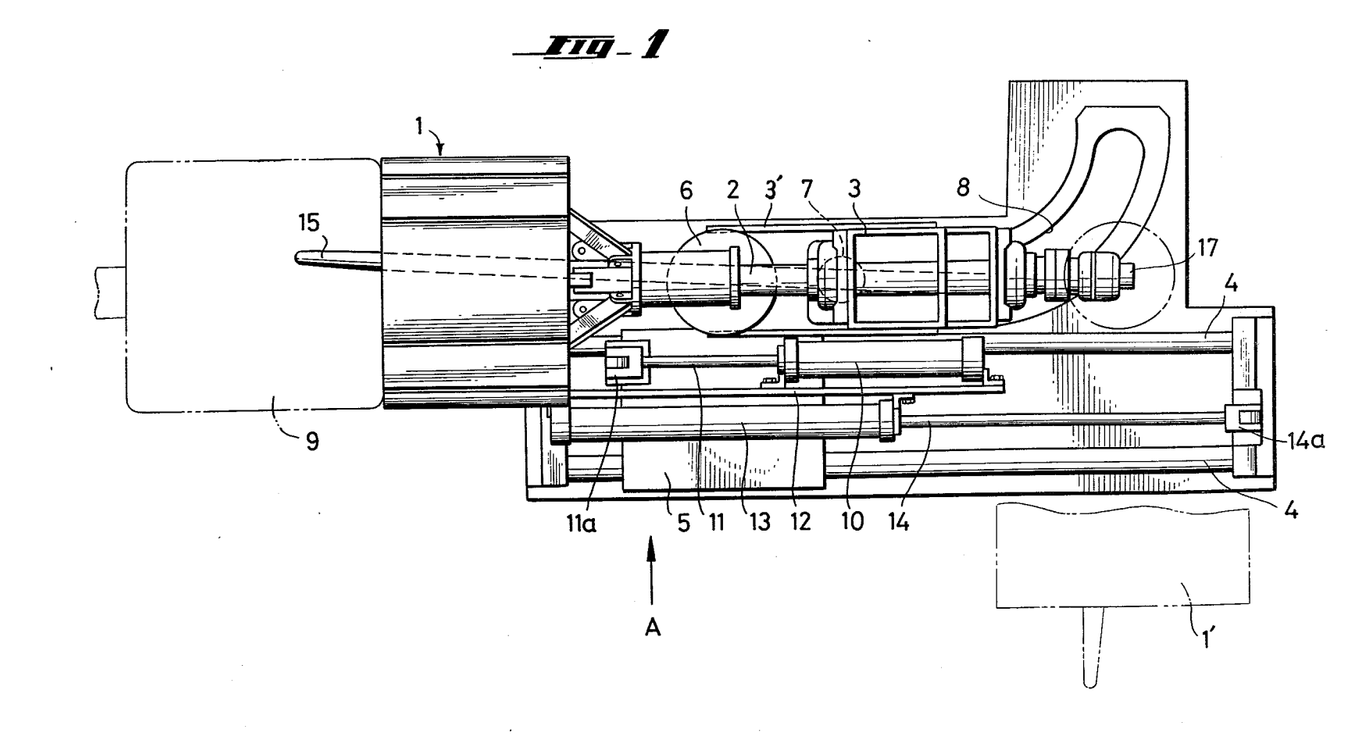
FIG. 1 is a plan view showing a preferred embodiment of the apparatus of the present invention.
Figure 2:
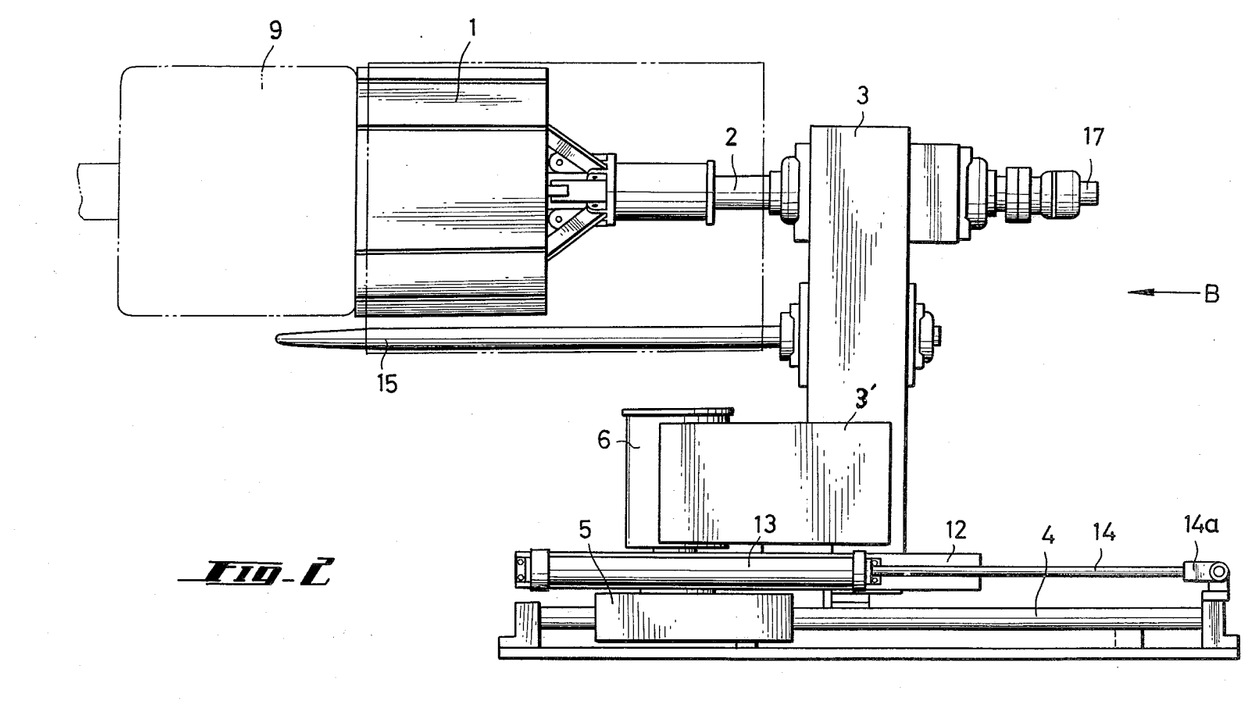
FIG. 2 is a plan view showing the apparatus of FIG. 1 as viewed in the direction of the arrow A shown in FIG. 1.

Referring now to FIGS. 1 and 2, an expandable drum 1 is supported on a shaft 2 which is in turn rotatably supported by a holding column 3.

The lower portion of the holding column 3 is secured to a cylinder 6 by means such as mounting plates 3' and the cylinder 6 is rotatably supported on a carriage 5 by means such as roller bearings (not shown) so as to be rotated about its longitudinal axis. The carriage 5 is in turn slidably guided by guide rods 4 secured to a machine base. Thus, the expandable drum 1 and the holding column 3 are moved together with the carriage 5 along the guide rods 4 while they are rotatable with respect to the carriage about the rotational axis of the cylinder 6. As shown in FIG. 1, the position of the column 3 is offset from the rotational axis of the cylinder 6.

As shown in FIGS. 1 and 2, a rotatable feeding bar 15 is rotatably supported on the column adjacent to the expandable drum 1 with the longitudinal axis thereof being located at a slight angle with respect to the longitudinal axis of the shaft 2 and, hence, the longitudinal axis of the expandable drum 1. The operation of the feeding bar 15 will be described later.

The holding column 3 is provided with a guide roller 7 at the bottom thereof at a position offset from the rotational axis of the cylinder 6 by means of roller bearings (not shown) and the guide roller 7 is slidably engaged within a guide groove 8 provided in the base of the apparatus. As shown in FIG. 1, the guide groove 8 is straight in parallel to the guide rods 4 except a curved portion provided at the right side end thereof as shown in FIG. 1. Therefore, when the carriage 5 is moved to the right in FIG. 1, the column 3 is rotated in the anticlockwise direction about the rotational axis of the cylinder 6 by the engagement of the guide roller 7 with the curved portion of the guide groove 8, while, when the carriage 5 is moved to the left the column 3 and, hence, the expandable drum 1 are moved along the longitudinal axis of the drum 1 which is oriented in parallel to the guide rods 4.

As shown in FIG. 1, when the carriage 5 is moved to the left, the expandable drum 1 abuts against a rotating forming drum 9 of a tire carcass producing equipment adapted to receive therein successively endless tire bands for forming a tire carcus with the longitudinal axis of the expandable drum 1 in alignment with the rotational axis of the forming drum 9 thereby permitting the expandable drum 1 to be rotated.

In this position, the expandable drum 1 is expanded and an endless tire band supported around the drum 1 and the feeding bar 15 is transferred to the forming drum 9 by the action of the feeding bar 15 as described later. When the carriage 5 is moved to the right in FIG. 1 and the column 3 and, hence, the drum 1 are rotated in the anticlockwise direction as shown by the two dot chain line and designated by 1' in FIG. 1, the expandable drum 1 is positioned and contracted so as to receive an endless tire band from a supply station thereof as described later.

In order to reciprocally move the carriage 5 along the guide rods 4, hydraulic cylinders 10 and 13 are provided. The outer end 11a of the piston rod 11 of the cylinder 10 is secured to the carriage 5 while the cylinder 10 per se is mounted on a supporting plate 12 on the opposite side of which the cylinder 13 is mounted with the free end 14a of the piston rod 14 of the cylinder 13 extending in the opposite direction to that of the piston rod 11 being secured to the base of the apparatus at a position remote from the outer end 11a of the piston rod 11. Thus, when the cylinders 10 and 13 are actuated to retract the respective piston rods 11 and 14, the carriage 5 is moved to the right in FIG. 1, while, when the piston rods 11 and 14 are extended, the carriage 5 is moved to the left in FIG. 1. Therefore, the holding column 3 is moved between the position at which the expandable drum 1 abuts against the forming drum 9 and the position at which the expandable drum 1 receives an endless tire band from the supply station by the actuation of the cylinders 10 and 13.

Figure 3:
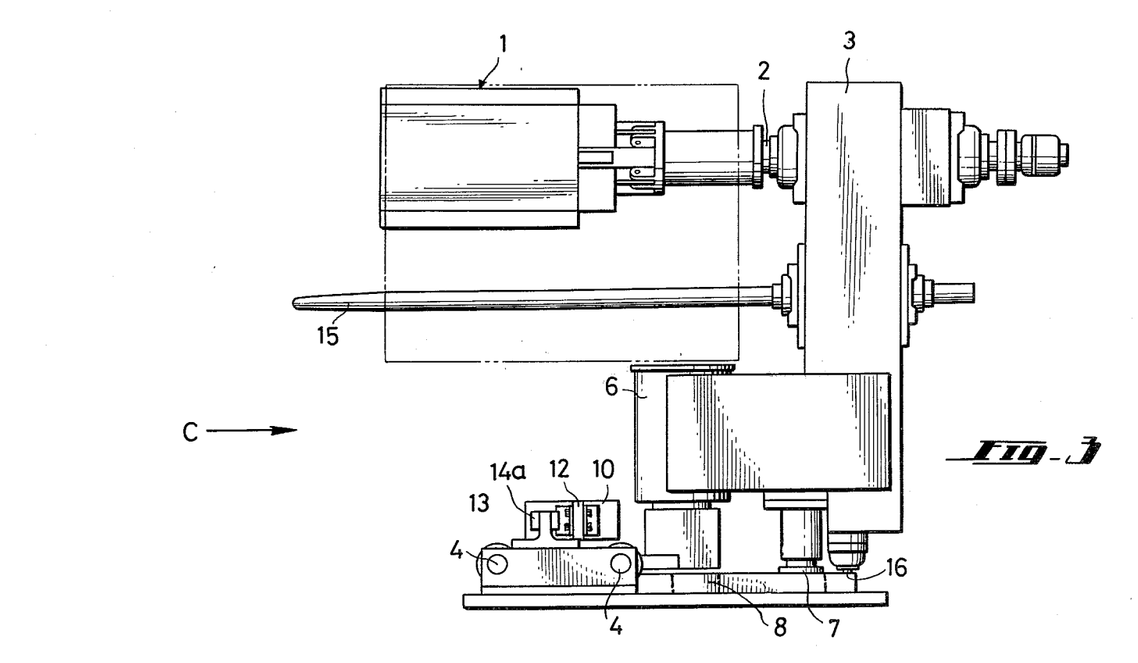
FIG. 3 is a side view showing the apparatus of FIG. 1 as viewed in the direction of the arrow B shown in FIG. 2, wherein the holding column is rotated by the angle of 90° from that shown in FIG. 2 and the expandable drum is brought to its contracted position.

FIG. 3 shows the position of the holding column 3 at which it is moved to the right as seen in FIG. 1 so that the expandable drum 1 is moved to the position shown by 1' in FIG. 1 at a right angle to the guide rods 4 and the expandable drum 1 is contracted so as to receive an endless tire band from the supply station around the contracted drum 1 and the feeding bar 15. In order to insure the upstanding position of the column 3, a guide ball 16 is mounted at the bottom of the column 3 which is rollingly guided on the surface of the plate in which the guide groove 8 is formed, as shown in FIG. 3.

In FIG. 1, the column 3 and hence the drum 1 are shown by the two dot chain line as being moved and rotated at a right angle when the carriage 5 is moved to the right. However, it is not necessary to rotate the column 3 superficially at a right angle, and the angle of rotation may be selected to be any angle. The rotation of the column 3 as described above enables the space required for the operation of the apparatus to be substantially reduced without causing any interference between the supply station and the apparatus.

Figures 4, 6:
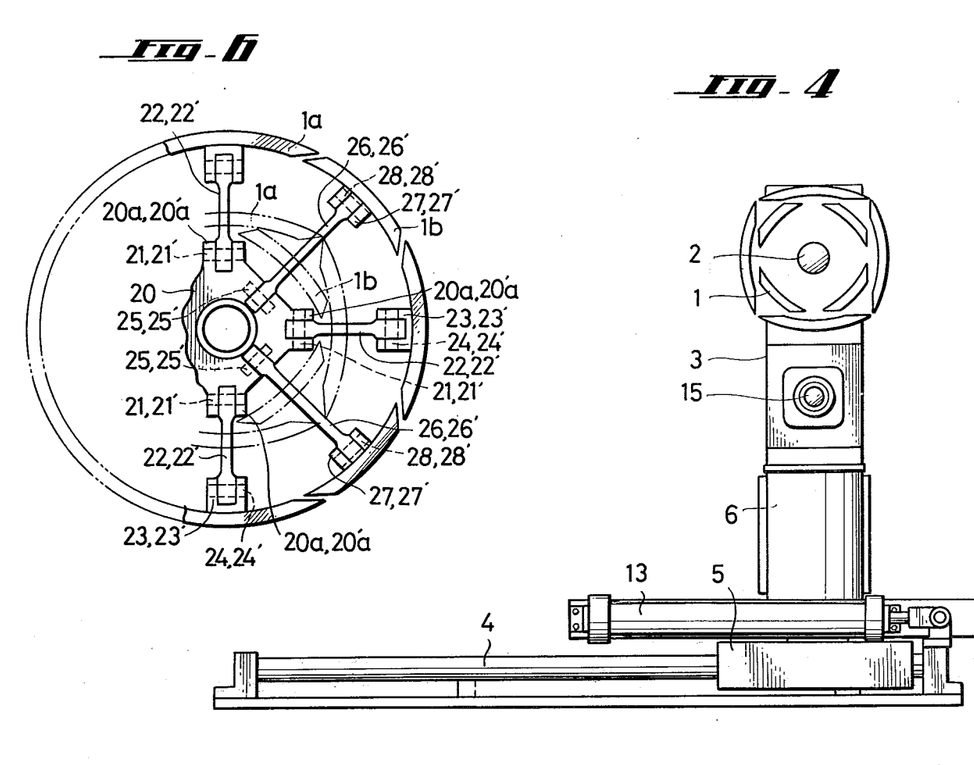
FIG. 4 is a side view showing the apparatus of FIG. 3 as viewed in the direction of the arrow C shown in FIG. 3 with portions omitted for the simplicity.
FIG. 6 is an end view showing the expanded and the contracted conditions of the expandable drum with portions omitted for the clear showing.
Figure 5:
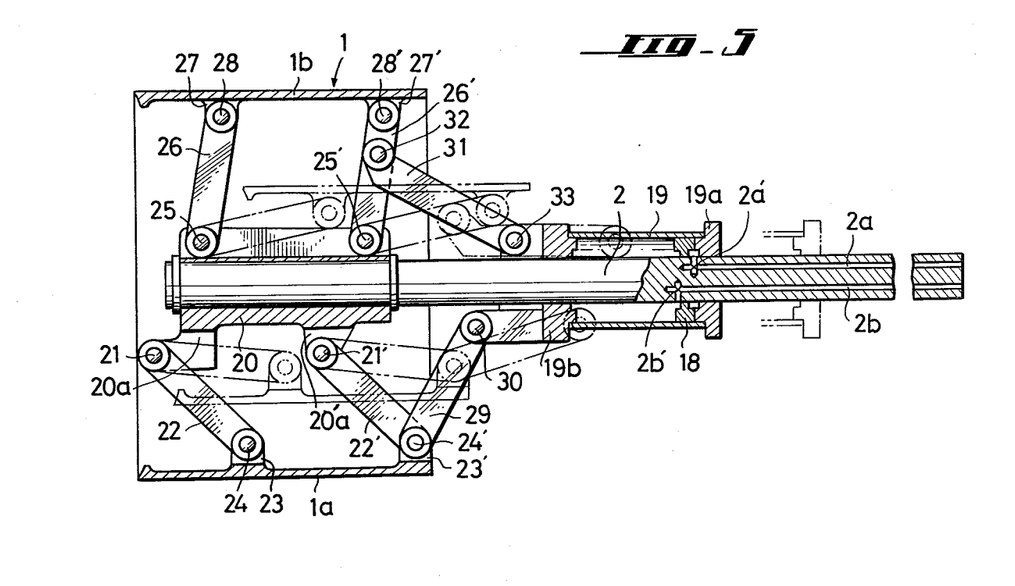
FIG. 5 is a fragmentary longitudinal sectional view showing the linkage mechanism for expanding and contracting the expandable drum.

FIGS. 5 and 6 show the linkage mechanism for expanding and contracting the expandable drum 1 and the manner how the drum 1 is expanded and contracted.

In FIG. 5, the shaft 2 is shown having formed therein a pair of elongated passages 2a, 2b extending therethrough and opening respectively at 2a' and 2b'. The passages 2a, 2b are supplied alternately with pressurized fluid from a supply (not shown) through a rotary joint 17 shown in FIGS. 1 and 2. A piston plate 18 is fixedly secured about the shaft 2 by securing means (not shown) at a position intermediate the openings 2a' and 2b', as shown in FIG. 5, and a cylindrical member 19 is fluidtightly and slidably fitted on the periphery of the piston plate 18, the right hand end of the cylindrical member 19 being fluidtightly secured to an end plate 19a which is fluidtightly and slidably engaged with the shaft 2 while the left hand end of the member 19 is fluidtightly secured to another end plate 19b which is fluidtightly and slidably engaged with the shaft 2 so that the cylindrical member 19 is reciprocally moved axially of the shaft 2 together with the end plates 19a, 19b between the position shown by the solid line and the position shown by the chain line by alternately supplying pressurized fluid through the openings 2a' or 2b' into either of the chambers defined by the member 19, end plates 19a and 19b and divided by the piston plate 18.

A sleeve 20 is mounted on the outer free end of the shaft 2, and the sleeve 20 is provided with pairs of radially projecting brackets 20a and 20'a, as shown in FIG. 6, the bracket 20a of each pair being axially aligned with the bracket 20'a and spaced therefrom, each pair of the brackets 20a and 20'a being angularly spaced at 90° from the adjacent pair of the brackets 20a and 20'a. One ends of parallel links 22 and 22' forming a pair are pivotally connected to the respective brackets 20a, 20'a of each pair by pivot shafts 21, 21' while the other ends of the links 22, 22' are pivotally connected to the respective brackets 23, 23' formed on the inner surface each of the segments 1a adapted to form a part of the cylindrical surface of the drum 1 by pivot shafts 24, 24', so that a parallelogram is formed by the sleeve 20, the links 22, 22' and the segment 1a thereby permitting the segment 1a to be moved toward and away from the shaft 2 with the segment 1a held in parallel to the shaft 2 by the swinging movement of the links 22, 22'.

In the similar manner, pairs of parallel links 26, 26' are pivotally connected to the sleeve 20 at their one ends by pivot shaft 25, 25' at angular positions bisecting the angle formed by the adjacent pairs of links 22, 22' as shown in FIG. 6 and the other ends of the links 26, 26' are pivotally connected respectively to brackets 27, 27' provided on the inner surface each of segments 1b adapted to form the remaining portion of the cylindrical surface of the drum 1 by pivot shafts 28, 28' so as to form a parallelogram by the sleeve 20, the links 26, 26' and the segments 1b thereby permitting the segment 1b to be moved toward and away from the shaft 2 by the swinging movement of the links 26, 26'.

As shown in FIG. 6, each of the segments 1a has the longitudinal side faces with the radially outward edges extending circumferentially beyond the inner edges, and each of the segments 1b has the longitudinal side faces with the radially inward edges extending circumferentially beyond the outer edges so that, when the segments 1a and 1b are moved away from the shaft 2 they assume the positions as shown by the solid line in FIG. 6 which corresponds to the expanded position of the expandable drum 1.

In order to effect the movement of the segments 1a and the segments 1b, one end of a link 29 is pivotally connected to each of the links 22' pivoted to the segment 1a with the other end being pivotally connected to the respective bracket formed on the end plate 19b by pivot shaft 30 as shown in FIG. 5, while one end of a link 31 is pivotally connected to each of the links 26' at a position intermediate its ends by a pivot shaft 32 as shown with the other end being pivoted to the respective bracket formed on the end plate 19b by a pivot shaft 33 thereby permitting the segments 1a and 1b to be moved toward and away from the shaft 2 by the actuation of the cylindrical member 19 and end plates 19a, 19b by means of pressurized fluid alternately introduced in the space defined thereby.

The relative positions and the dimensioning of the elements described above are so determined that, when the end plate 19b is moved to the left as shown by the solid line in FIG. 5, the segments 1a and 1b are moved to assume the expanded position of the expandable drum 1.

Since the links 29 are pivotally connected to the outer ends of the links 22', respectively, while the links 31 are pivotally connected to the intermediate portions of the respective links 26', the links 26' are swung by a greater angle than the angle of swinging of the links 22' by the same amount of shifting of the end plate 19b.

Therefore, when the end plate 19b is moved to the right in FIG. 5, the segments 1b are moved toward the shaft 2 quicker than the segments 1a so that the segments 1b are positioned inside of the segments 1a as shown by chain line in FIG. 6. These positions of the segments 1a and 1b correspond to the contracted position of the expandable drum 1.

In accordance with the characteristic feature of the present invention, the expandable drum 1 is actuated in timed relation with the actuation of the carriage 5 by a control system (not shown), so that, when the carriage 5 is moved to locate the expandable drum 1 at the supply station (FIGS. 3 and 4), the expandable drum 1 is contracted so as to permit an endless tire band to be supplied around the drum 1 and the feeding bar 15 from the supply station, while, when the carriage 5 is moved to locate the expandable drum 1 in abutting relationship against the forming drum 9 of the tire carcass producing equipment as shown by the solid line in FIG. 1 so as to be rotated thereby, the drum 1 is expanded so as to permit the endless tire band supported around the expanded drum 1 and the feeding bar 15 to be transferred onto the forming drum 9 by the action of the feeding bar 15 by virtue of the axis thereof being oriented at a small angle with respect to that of the expandable drum 1 so as to generate an axial component of force which is applied to the endless tire band for driving the same axially toward the forming drum 9 while the endless tire band is rotating around the feeding bar 15.

In other words, the alternate supply of the pressurized fluid for actuating the expandable drum 1 is timed with the actuation of the cylinders 10 and 13 for moving the carriage 5 by the control system so as to effect the above mentioned coupled operations.

In operation, the holding column 3 is first moved to the right in FIG. 1 by the actuation of the cylinders 10 and 13 so that the column 3 is rotated by the engagement of the guide roller 7 with the guide groove 8 so as to locate the expandable drum 1 at the supply station as shown by 1' in FIG. 1, and at the same time, pressurized fluid is introduced through passage 2a into the chamber defined by the member 19, the end plate 19a and the piston plate 18 so as to move the end plate 19b together with the member 19 to the right in FIG. 5 thereby contracting the expandable drum 1 as previously described. Thus, an endless tire band is permitted to be supplied around the drum 1 and the feeding bar 15 from the supply station. The contraction of the drum 1 may also be effected during the movement of the column 3 toward the supply station or after the endless tire band has been supplied from the drum 1 to the forming drum 9 as described below.

Then, pressurized fluid is switched to be introduced through the passage 2b instead of the passage 2a into the chamber defined by the member 19, the end plate 19b and the piston plate 18 so that the expandable drum 1 is expanded thereby permitting the endless tire band to be securely supported around the expanded drum 1 and the feeding bar 15, and the cylinders 10 and 13 are actuated so as to move the carriage 5 to the left in FIG. 1 thereby rotating the column 3 and moving the expanded drum 1 toward the forming drum 9 in axial alignment therewith. When the expanded drum 1 abuts against the forming drum 9, the same is rotated by the drum 9 so that the endless tire band supported around the expanded drum 1 and the feeding bar 15 is transferred onto the forming drum 9 by the action of the feeding bar 15.

The above procedures are automatically repeated and the endless tire bands are successively supplied from the supply station to the forming drum 9.

In the embodiment described above, two cylinders 10 and 13 are shown as being utilized for the movement of the carriage 5. However, the number of the cylinders may be reduced to one or increased more than two as desired according to the design, and the angle of rotation of the column 3 may be selected to be any angle other than 90° insofar as it serves to reduce the working space.

As described above, the apparatus of the present invention operates in fully automatic manner thereby saving the man-hour and increasing the efficiency.

We claim:

1. Apparatus for successively supplying endless tire bands from a supply station thereof onto a forming drum in a tire carcass producing equipment adapted to receive therearound said endless tire band upon rotation thereof, wherein the improvement comprises:
    a holding column mounted on a base of said apparatus and movable between a first position and a second position;
    an expandable drum rotatably mounted on said holding column and movable between an expanded position and a contracted position and a feeding bar also rotatably mounted on said holding column adjacent to the periphery of said expandable drum with the axis of rotation thereof being oriented at a small angle with respect to that of said expandable drum for cooperation therewith so as to move an endless tire band supported around said drum and said bar axially out of said drum when said drum is rotated while the same is brought to said expanded position.
    driving means for moving said column reciprocably between said first position and said second position, said expandable drum being so positioned on said column that the same is contracted with said forming drum in alignment therewith so as to be rotated thereby when said column is brought to said first position while said expandable drum is brought to said supply station when said column is brought to said second position;
    actuating means for moving said expandable drum between said expanded position and said contracted position, and
    control means for operating said driving means and said actuating means in such timed relationship therebetween that said expandable drum is brought to said contracted position when said column is brought to said second position thereby permitting said drum and said feeding bar to receive therearound an endless tire band from said supply station due to the fact that the effective diameter of said drum and said feeding bar is less than the diameter of said tire band while said expandable drum is brought to said expanded position when said column is brought to said first position so as to contact said expandable drum with said forming drum for rotation therewith thereby permitting said endless tire band supported around said drum and said feeding bar to be supplied therefrom onto said forming drum due to the fact that the effective diameter of said drum and said feeding bar is slightly greater than the diameter of said forming drum, the axis of said feeding bar is oriented at a small angle with respect to that of the expandable drum so as to generate an axial component of force which is applied to the endless tire band for driving the same axially toward the forming drum while the endless tire band is rotating around the expandable drum and the feeding bar, and the tip of said feeding bar terminates at a position slightly axially inwardly of that end of said forming drum which is adjacent said feeding bar,
    whereby said tire bands are automatically supplied from said expandable drum to said forming drum.

2. Apparatus according to claim 1, wherein said holding column is secured to a rotatable cylinder which is in turn rotatably supported on a carriage slidably mounted on guide bars secured to said base, hydraulic cylinder means interconnecting said carriage with said base so as to reciprocally move said carriage for the movement of said column between said first position and said second position, said column being provided with guide roller means at the bottom thereof at a position offset from the rotational axis of said rotatable cylinder, guide groove means being provided in said base substantially in parallel to the movement of said carriage and engaging with said guide roller means, said guide groove means having a curved portion adjacent to an end thereof corresponding to said second position of said column thereby permitting said column to be rotated by the engagement of said guide roller means with said guide groove means so as to bring said expandable drum to said supply station when said column is brought to said second position.

3. Apparatus according to claim 1, wherein said expandable drum is mounted on a shaft rotatably mounted on said holding column and comprises a first series of segments and a second series of segments with segments of said first series alternating with the respective segments of said second series and an operating means mounted on said shaft and reciprocally movable along said shaft upon operation of said control means in timed relationship with said movement of said column, each of said segments of said first and second series being pivotally connected by a pair of parallel links with said shaft for forming a parallelogram by said segment, said pair of links and said shaft so as to permit said segment to be moved to said expanded position and said contracted position with said segment being kept in parallel to the axis of said shaft, one of each pair of said links of said first series of said segments being connected at its end pivotally connected to the respective segment being pivotally connected to said operating means while one of each pair of said links of said second series is pivotally connected at a position intermediate its ends to said operating means so that, upon actuation of said operating means, said second series of segments is moved closer to said shaft than said first series when said expandable drum is brought to said contracted position while said first and second series of segments are moved to assume said expanded position of said drum, when they are moved apart from said shaft by said operating means.

4. Apparatus according to claim 3, wherein said operating means is hydraulically operable cylinder means slidably mounted on said shaft with the fluid being introduced thereto through either of a pair of conduits formed in said shaft for the reciprocal movement on said shaft of said hydraulically operable cylinder means.

* * * * *